(12) United States Patent
Samejima et al.

(10) Patent No.: US 10,099,460 B2
(45) Date of Patent: Oct. 16, 2018

(54) METHOD FOR PRODUCING PREFORM AND METHOD FOR PRODUCING FIBER-REINFORCED PLASTIC MOLDING

(75) Inventors: Sohei Samejima, Chiyoda-ku (JP); Hajime Takeya, Chiyoda-ku (JP); Michihito Matsumoto, Chiyoda-ku (JP); Hiroki Kobayashi, Chiyoda-ku (JP); Kazuki Kubo, Chiyoda-ku (JP); Yuhei Awano, Chiyoda-ku (JP); Takahiro Mabuchi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 905 days.

(21) Appl. No.: 14/351,761

(22) PCT Filed: Sep. 6, 2012

(86) PCT No.: PCT/JP2012/072743
§ 371 (c)(1),
(2), (4) Date: Apr. 14, 2014

(87) PCT Pub. No.: WO2013/084552
PCT Pub. Date: Jun. 13, 2013

(65) Prior Publication Data
US 2014/0261993 A1 Sep. 18, 2014

(30) Foreign Application Priority Data
Dec. 6, 2011 (JP) .................................. 2011-266885

(51) Int. Cl.
*B32B 37/00* (2006.01)
*B29B 11/16* (2006.01)
(Continued)

(52) U.S. Cl.
CPC .............. *B32B 37/00* (2013.01); *B29B 11/16* (2013.01); *B29C 43/12* (2013.01); *B29C 43/28* (2013.01);
(Continued)

(58) Field of Classification Search
CPC ....... B29B 11/16; B29C 43/28; B29C 43/305; B29C 43/3642; B29C 2043/3644;
(Continued)

(56) References Cited

U.S. PATENT DOCUMENTS 5,427,725 A  6/1995  White et al.
5,427,726 A  6/1995  White et al.
(Continued)

FOREIGN PATENT DOCUMENTS

CN  101232985 A  7/2008
CN  101479086 A  7/2009
(Continued)

OTHER PUBLICATIONS

International Search Report dated Nov. 27, 2012 in PCT/JP12/072743 Filed Sep. 6, 2012.

*Primary Examiner* — Vishal I Patel
(74) *Attorney, Agent, or Firm* — Oblon, McClelland, Maier & Neustadt, L.L.P.

(57) ABSTRACT

A method for producing a preform for manufacture of a fiber-reinforced plastic molding. The method includes: fixing a resin-equipped film rolled out from a roll state including a release film and a fixing resin and containing a partially-cured thermosetting resin, to a surface of the dry fiber fabric rolled out from a roll with the fixing resin interposed therebetween, thereby obtaining a first dry fiber fabric; separately fixing the resin-equipped film to a surface of the dry fiber fabric rolled out from a roll with the fixing resin interposed therebetween, and detaching the release
(Continued)

(a)

(b)

film, thereby obtaining one or more second dry fiber fabrics; and laminating the second dry fiber fabrics on a surface of the first dry fiber fabric with the fixing resin of the second dry fiber fabrics interposed therebetween.

3 Claims, 6 Drawing Sheets

(51) Int. Cl.
- *B29C 43/28* (2006.01)
- *B29C 43/36* (2006.01)
- *B29C 43/12* (2006.01)
- *B29C 43/30* (2006.01)
- *B29C 43/48* (2006.01)
- *B29C 70/44* (2006.01)

(52) U.S. Cl.
CPC ........ *B29C 43/3642* (2013.01); *B29C 43/305* (2013.01); *B29C 70/443* (2013.01); *B29C 2043/3644* (2013.01); *B29C 2043/486* (2013.01)

(58) Field of Classification Search
CPC . B29C 2043/486; B29C 70/443; B29C 43/12; B32B 37/00
See application file for complete search history.

(56) References Cited

U.S. PATENT DOCUMENTS

| | | | |
|---|---|---|---|
| 5,721,051 | A | 2/1998 | White et al. |
| 2004/0170554 | A1* | 9/2004 | Wadahara ............... B29B 11/16 |
| | | | 423/447.2 |
| 2006/0125155 | A1* | 6/2006 | Sekido .................. B29C 70/443 |
| | | | 264/511 |
| 2008/0099131 | A1 | 5/2008 | Umeda et al. |
| 2008/0299395 | A1* | 12/2008 | Strange ...................... C08J 5/24 |
| | | | 428/409 |

FOREIGN PATENT DOCUMENTS

| | | |
|---|---|---|
| EP | 1 918 089 A2 | 5/2008 |
| JP | 60 83826 | 5/1985 |
| JP | 8 509922 | 10/1996 |
| JP | 2002 249984 | 9/2002 |
| JP | 2003 82117 | 3/2003 |
| JP | 2003-340947 A | 12/2003 |
| JP | 2004 114586 | 4/2004 |
| JP | 2004 269705 | 9/2004 |
| JP | 2005 262818 | 9/2005 |
| JP | 2006 76158 | 3/2006 |
| JP | 2006-256202 A | 9/2006 |
| JP | 2008 110539 | 5/2008 |
| JP | 2009 235182 | 10/2009 |
| WO | 2012 066805 | 5/2012 |

* cited by examiner

METHOD FOR PRODUCING PREFORM AND METHOD FOR PRODUCING FIBER-REINFORCED PLASTIC MOLDING

TECHNICAL FIELD

The present invention relates to a method for producing a fiber-reinforced plastic molding under a pressure-reduced atmosphere and a method for producing a preform used in the method.

BACKGROUND ART

Fiber-reinforced plastic (FRP) attracts attention in various industrial fields as light-weighted and high-strength material. In recent years, to produce a relatively large fiber-reinforced plastic molding at a low cost, there has been employed a vacuum assist resin transfer molding (VaRTM) for molding fiber-reinforced plastic under a depressurized atmosphere by means of vacuum suction. The vacuum assist resin transfer molding is a method for obtaining a fiber-reinforced plastic molding including the steps of covering a dry fiber fabric arranged in a molding die with a bag film, vacuuming the air inside the bag, infusing a liquid resin into the bag film, impregnating the dry fiber fabric with resin, and curing the resin (for example, refer to PTD1: Japanese Patent Laying-Open No. 60-83826).

However, since a dry fiber fabric has no tackiness (viscosity), the dry fiber fabric itself cannot be fixed at a position against gravity in the step of shaping into a three-dimensional shape (the step of arranging a dry fiber fabric on a molding die and the step of laminating a dry fiber fabric on a dry fiber fabric). Further, when a dry fiber fabric and a molding die, or a dry fiber fabric and a dry fiber fabric are not in sufficient contact with each other, fibers in some cases exhibited wrinkles under the depressurized condition.

As a simplified method for solving such a problem, a method is conceivable using a tape to fix a portion being subject to trimming and not eventually used in a finished product. However, there is a problem that a portion which can be fixed using a tape is limited, and that the operation is cumbersome and results in low productivity.

Therefore, there have been proposed a method for fixing a dry fiber fabric through use of a solution with a binder containing an amorphous thermoplastic resin (tackifier: spray) (for example, refer to PTD2: Japanese Patent Laying-Open No. 2004-269705) and a method for shortening the step of laminating dry fiber fabrics by adhering a plurality of dry fiber fabrics to each other in advance by means of an adhesive resin composed of a mixture of a thermoplastic resin (toughness) and thermosetting resin (for example, refer to PTD3: Japanese Patent Laying-Open No. 2004-114586).

The method disclosed in PTD2 can be used in the step of arranging a dry fiber fabric on a molding die and in the step of laminating a dry fiber fabric on a dry fiber fabric, allowing the operation time to be shortened. However, when the method is used in the step of arranging a dry fiber fabric on a molding die, a non-cured thermoplastic component is exposed at the surface of a demolded fiber-reinforced plastic molding. Therefore, there has been a problem that the surface which was in contact with the molding die may become sticky and that a thermoplastic component may exhibit white dots to cause poor appearance.

Further, the method disclosed in PTD3 can be used in the step of laminating a dry fiber fabric on a dry fiber fabric, allowing the operation time to be shortened. However, the method cannot be used in the step of arranging a dry fiber fabric on a molding die. Further, when a plurality of dry fiber fabrics are combined in advance, and a large number of layers are present, shaping at a bent portion becomes difficult. Particularly, the tension applied to the fiber will differ between the inside and outside, resulting in occurrence of wrinkles due to loosening of fibers.

Furthermore, with the method disclosed in PTD 3 in which a bonding resin containing a thermoplastic resin as a main component is used, heating for welding is required. Moreover, a thermoplastic resin which melts at a relatively low temperature is disadvantageous in heat resistance. On the other hand, when a high melting temperature thermoplastic thermoplastic resin is used, lamination of dry fiber fabrics is possible, but it is difficult to fix a dry fiber fabric to a molding die. The high melting temperature thermoplastic resin has insufficient tackiness particularly to a molding die having been subjected to mold release processing. Moreover, with the method disclosed in PTD 3, it is not easy to cut a dry fiber fabric into an intended shape.

CITATION LIST

Patent Document

PTD 1: Japanese Patent Laying-Open No. 60-83826
PTD 2: Japanese Patent Laying-Open No. 2004-269705
PTD 3: Japanese Patent Laying-Open No. 2004-114586

SUMMARY OF INVENTION

Technical Problem

In view of the above-described problems, an object of the present invention is to provide a method for producing a preform that can be produced continuously in a rolled form without requiring heating, and a method for producing a fiber-reinforced plastic molding.

Solution to Problem

The present invention is a method for producing a preform for manufacture of a fiber-reinforced plastic molding including a dry fiber fabric and a resin-equipped film. The resin-equipped film includes a release film and a fixing resin fixed to one side of the release film and containing a partially-cured thermosetting resin having tackiness at a room temperature. The method includes a first step of fixing the resin-equipped film rolled out from a roll state to a surface of the dry fiber fabric rolled out from a roll state with the fixing resin interposed therebetween, thereby obtaining a first dry fiber fabric having the release film and the fixing resin, a second step of separately fixing the resin-equipped film rolled out from a roll state to a surface of the dry fiber fabric rolled out from a roll state with the fixing resin interposed therebetween, and detaching the release film from the resin-equipped film attached by pressure to the dry fiber fabric, thereby obtaining one or more second dry fiber fabrics having the fixing resin, and a step of laminating the second dry fiber fabrics on a surface of the first dry fiber fabric where the fixing resin is not fixed with the fixing resin of the second dry fiber fabrics interposed therebetween.

Preferably, the method further includes the step of cutting the preform into an intended shape after a cutting machine vacuum holds a surface of the preform on the side of the release film.

Preferably, the preform is previously pressurized by a pressure higher than an atmospheric pressure using a roll press.

Preferably, the fixing resin has the form of dots, and each of the dots has an area smaller than an area of each sparse portion where fibers of the dry fiber fabric do not overlap each other.

Preferably, the fixing resin having the form of dots has a pitch larger than a pitch of the fibers of the dry fiber fabric, and is not an integral multiple of the pitch of the fibers constituting the dry fiber fabric.

Preferably, the method includes the step of performing a heat treatment on the fixing resin having the form of dots, thereby making the area of the fixing resin having the form of dots smaller than the area of the sparse portion where the fibers of the dry fiber fabric do not overlap each other.

Preferably, at least part of the fixing resin is linear. More preferably, the linear part of the fixing resin has a width smaller than the pitch of the fibers constituting the dry fiber fabric. More preferably, an arrangement direction of the linear part of the fixing resin and a direction of the fibers constituting the dry fiber fabric make an angle other than 45°.

Preferably, the position of the linear part of the fixing resin differs among the first dry fiber fabric and the second dry fiber fabrics.

The present invention also relates to a method for producing a fiber-reinforced plastic molding, comprising, in the following order, the steps of shaping by fixing the preform to a molding die with a fixing resin interposed therebetween while detaching the release film of the above-described preform, impregnating the dry fiber fabric in the preform fixed to the molding die, with a liquid thermosetting resin, curing the liquid thermosetting resin and the fixing resin to form a fiber-reinforced plastic molding, and demolding the fiber-reinforced plastic molding from the molding die.

Preferably, it includes the step of fixing a peel ply and/or a flow media onto the resin-equipped fiber fabric of the preform from which the release film has been detached, using a resin-equipped film wound in a roll including a release film and a fixing resin adhering to one surface of the release film and containing a partially-cured thermosetting resin having tackiness at a room temperature.

Preferably, the fiber-reinforced plastic molding has a foam core material between the dry fiber fabrics, and the method includes the step of attaching the dry fiber fabrics and the foam core material by pressure, using a resin-equipped film wound in a roll including a release film and a fixing resin adhering to one surface of the release film and containing a partially-cured thermosetting resin having tackiness at a room temperature.

Advantageous Effects of Invention

A fixing resin used in the present invention (a partially-cured thermosetting resin exhibiting tackiness at room temperature) does not contain a thermoplastic component. Therefore, even when the fixing resin is used on a surface in contact with a molding die, no viscosity and white dots occur. Therefore, a fiber-reinforced plastic molding having fine appearance can be obtained.

Further, since a preform of the present invention includes the fixing resin, the position of the preform can be fixed without being affected by gravity, so that the step of shaping into a three-dimensional shape (the step of arranging a dry fiber fabric on a molding die and the step of laminating a dry fiber fabric on a dry fiber fabric) can be simplified, resulting in improved productivity.

Moreover, the preform of the present invention can be produced continuously in a rolled form without requiring heating. Furthermore, since the preform of the present invention has a release film on one side and is adsorbable, the preform can easily be processed into a predetermined shape with a cutting machine, such as a cutting plotter.

BRIEF DESCRIPTION OF DRAWINGS

FIG. 1 shows at (a) a schematic cross-sectional view showing an example of a resin-equipped film of the present invention and at (b) a schematic cross-sectional view showing another example of a resin-equipped film of the present invention.

FIG. 2 shows at (a) a top view showing an example of a resin-equipped film of the present invention and at (b) a top view showing another example of a resin-equipped film of the present invention.

FIG. 3 shows at (a) a schematic cross-sectional view showing an example of a preform of the present invention and at (b) a schematic cross-sectional view showing another example of a preform of the present invention.

DESCRIPTION OF EMBODIMENTS

<Resin-Equipped Film>

Figure 1:
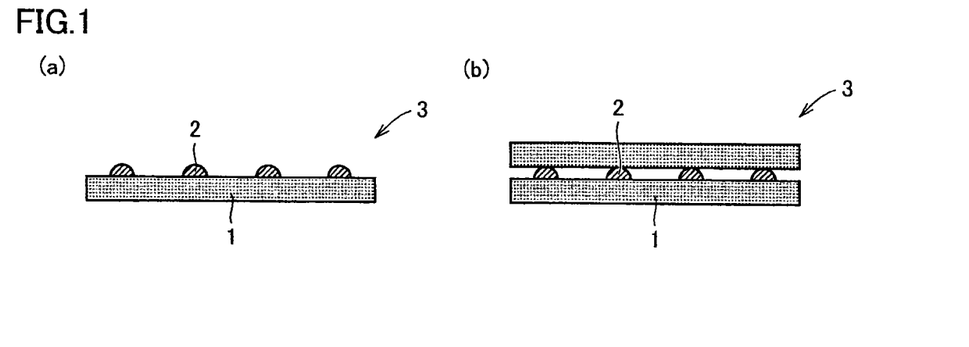

A resin-equipped film 3 of the present invention is used for manufacture of a preform 5 and a fiber-reinforced plastic molding. FIG. 1 shows schematic cross-sectional views of resin-equipped film 3. As shown in FIG. 1 at (a), resin-equipped film 3 includes, on a release film 1, a fixing resin 2 containing a partially-cured thermosetting resin having tackiness at a room temperature. In order to enable supply in a roll, as shown in FIG. 1 at (b), both sides of release film 1 may be covered with release film 1. Although the method for producing a resin-equipped film is not particularly limited, screen printing is preferable.

The fixing resin is not particularly limited as long as it is a partially-cured thermosetting resin having tackiness at a room temperature. Examples include an epoxy resin, a polyimide resin, and a phenol resin. Preferably, the fixing resin is a vinyl ester resin having both of a (meta-)acryloyl group and an epoxy group in an identical resin skeleton. The fixing resin may contain pigment such as carbon black. The fixing resin may contain a small amount of tackifier such as rosin ester. Further, a release paper or the like may be used in place of the release film.

Figure 2:
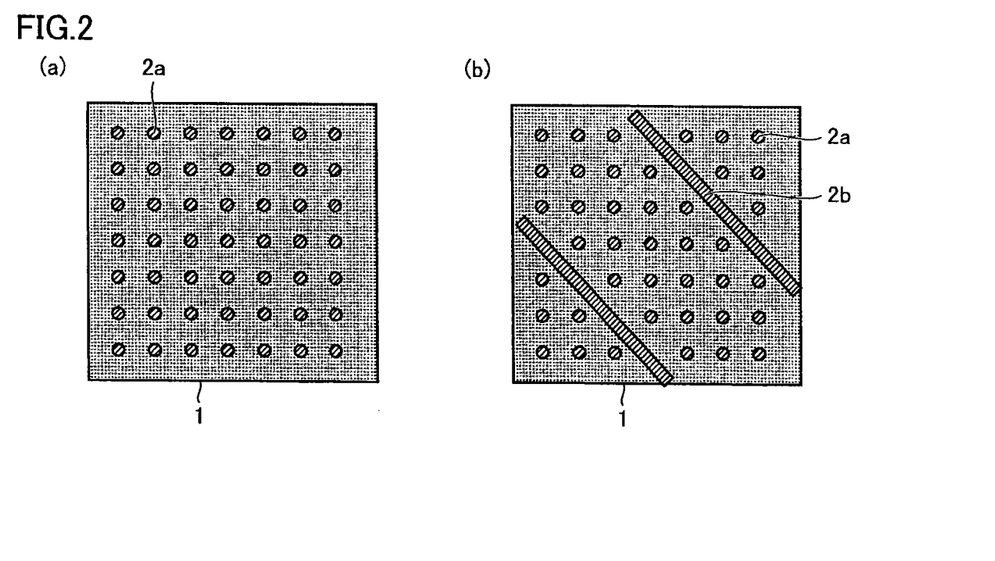

FIG. 2 shows top views of resin-equipped film 3. As shown in FIG. 2 at (a), fixing resin 2 is preferably a dot-like fixing resin 2a so as not to interfere with resin impregnation. As shown in FIG. 2 at (b), not only dot-like fixing resin 2a but also linear fixing resins 2b are preferably arranged at a spacing (about 100 mm) that does not affect resin impregnation so as to prevent twist of a dry fiber fabric and fraying at an end thereof.

<Preform>

A preform is a member including a dry fiber fabric and the above-described resin-equipped film attached to a surface of the dry fiber fabric by pressure with the fixing resin interposed therebetween. The preform is used for producing a fiber-reinforced plastic molding. It is intended that the "surface" of the dry fiber fabric herein does not include an inner surface at a void in the dry fiber fabric.

Figure 3:
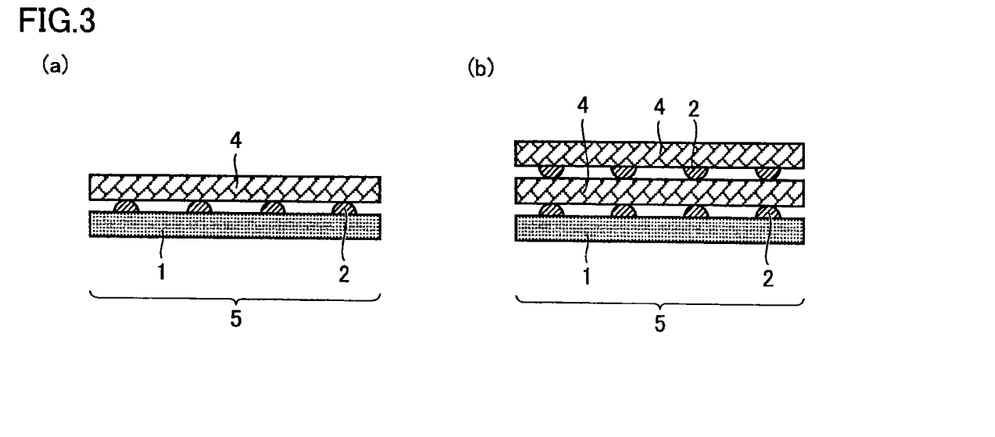

FIG. 3 shows a schematic cross-sectional view of a preform. As shown in FIG. 3 at (a), the preform of the present invention is a preform 5 in which dry fiber fabric 4 and release film 1 are attached by pressure with fixing resin 2 interposed therebetween. As shown in FIG. 3 at (b), in preform 5, a plurality of dry fiber fabrics 4 may be attached by pressure with fixing resins 2 interposed therebetween.

Dry fiber fabric 4 may be a fabric of a carbon fiber, a glass fiber, a Zyron fiber, a Kevlar fiber, or the like. A carbon fiber is preferable.

<Method for Producing Preform>

Figure 4:
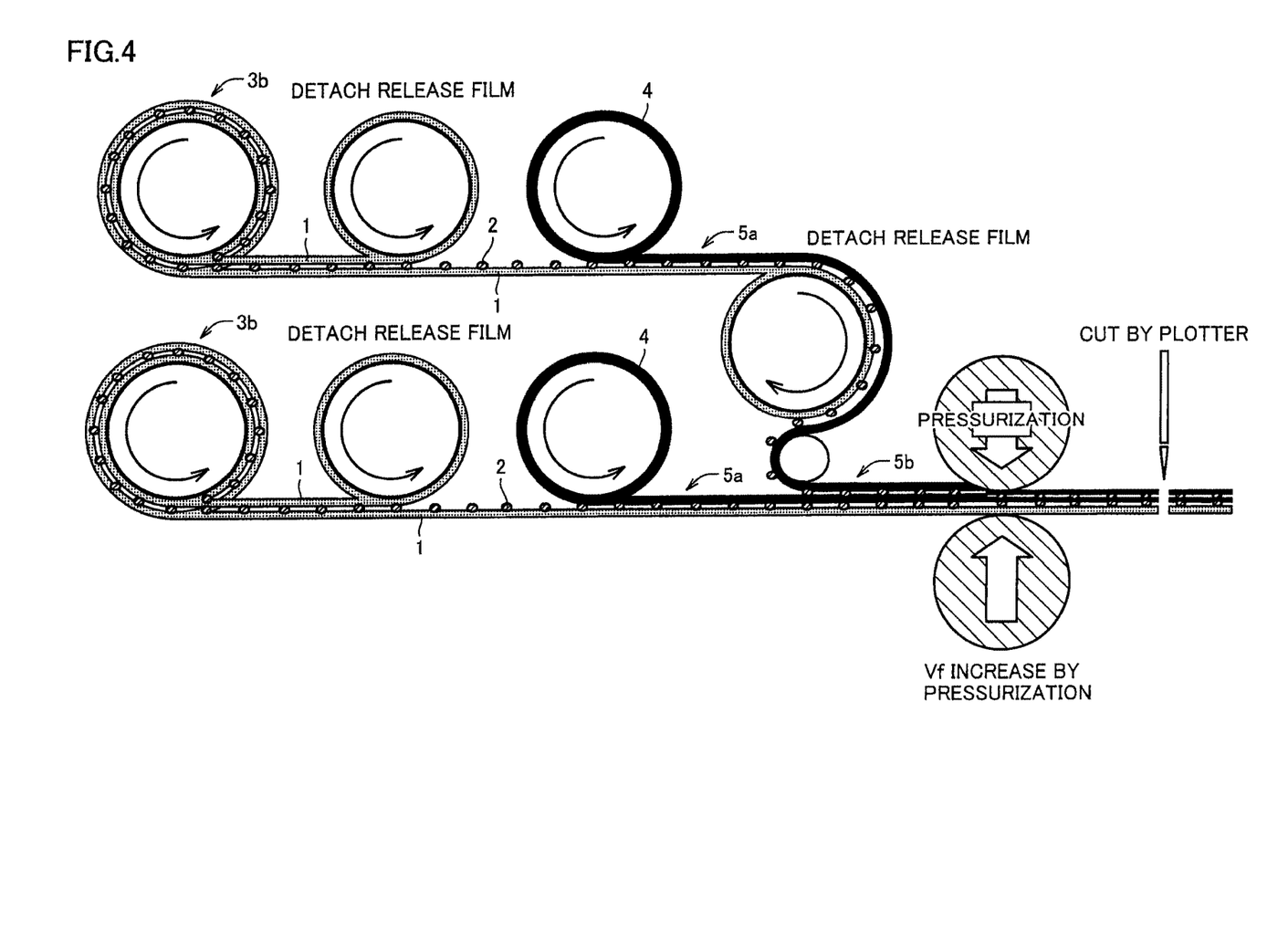
FIG. 4 is a schematic cross-sectional view for illustrating an example of a method for producing a preform of the present invention.

The preform of the present invention can be produced continuously in a roll. FIG. 4 shows a schematic cross-sectional view for illustrating an example of a method for producing a preform of the present invention. First, two rolled resin-equipped films 3b each having release films 1 on the opposite sides of fixing resin 2 are prepared.

Next, release film 1 of one side of one of resin-equipped films 3b is removed, and is attached by pressure to dry fiber fabric 4 rolled out from a roll state to obtain a preform 5a. Next, release film 1 on the other side of preform 5a is rewound. A second dry fiber fabric having fixing resin 2 is thus obtained.

Concurrently, release film 1 on one side of the other resin-equipped film 3b (on the lower side in FIG. 4) is removed, and is attached by pressure to dry fiber fabric 4 rolled out from a roll state to obtain a first dry fiber fabric (preform 5a) having fixing resin 2 equipped with release film 1.

Then, the second dry fiber fabric is laminated on the first dry fiber fabric (preform 5a). The obtained preform laminate 5b is pressurized by a roll press (at 10 kgf/cm$^2$) to vacuum hold the release film side to a cutting machine, and then cut into an intended shape. Pressurization by the roll press (at about 10 kgf/cm$^2$), a preform which will be a fiber reinforced plastic having thin plate thickness, that is, having high fiber content is obtained.

<Relation between Dry Fiber Fabric and Fixing Resin>

Figure 5:
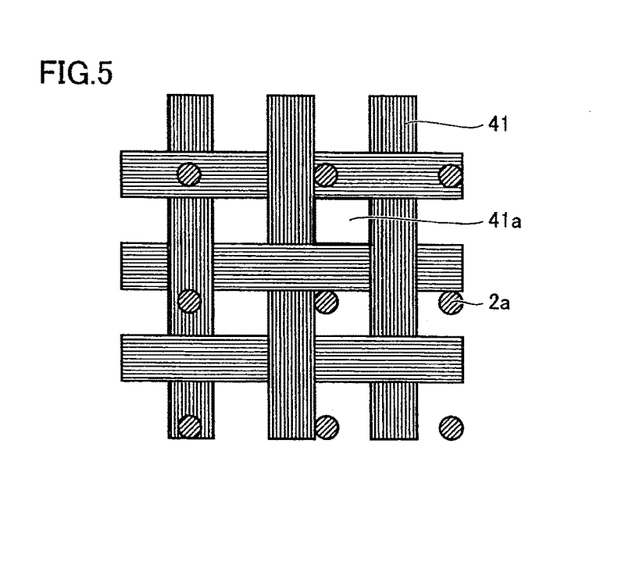
FIG. 5 is a top view showing the relation between a dry fiber fabric and a dot-like fixing resin in an example of a preform of the present invention.

FIG. 5 shows the relation between dry fiber fabric 4 and dot-like fixing resin 2a. The area of dot-like fixing resin 2a is preferably smaller than a portion 41a where fibers 41 of dry fiber fabric 4 are sparse so as not to block impregnation of a liquid thermosetting resin when producing a fiber-reinforced plastic molding. Moreover, in terms of adhesion between the dry fiber fabric and the fixing resin and stability in mechanical strength, the arrangement pitch of dot-like fixing resin 2a preferably has regularity and is larger than the pitch of the dry fiber fabric, and more preferably, is not an integral multiple of the pitch of the dry fiber fabric.

For example, the dot preferably has a diameter of less than or equal to 0.75 mm in a plain weave cloth in which the fiber diameter is 7 μm, the fiber aerial weight is 210g/m$^2$, the number of horizontal and vertical fiber tows per 25 mm width is 3.27, the pitch of a fiber fabric is 7.6 mm, the fiber width is 6.85 mm, and a portion in which fibers are sparse is 0.75 mm×0.75 mm. However, it is preferable that these values are those in a state where the fixing resin is attached by pressure to the dry fiber fabric, namely, a collapsed state, not in the state of the resin-equipped film. Therefore, in the state of the resin-equipped film, the dot preferably has a diameter of ¼ to ⅓ of the dot diameter in the state attached by pressure.

Moreover, in terms of adhesion between the dry fiber fabric and the fixing resin and stability in mechanical strength, the arrangement pitch of dot-like fixing resin 2a preferably has regularity and is larger than the pitch of the dry fiber fabric, and more preferably, is not an integral multiple of the pitch of the dry fiber fabric.

When the fiber fabric has a pitch of 7.6 mm, the arrangement pitch of the dot-like fixing resin preferably has a value that is not an integral multiple more than or equal to 7.6 mm. In this case, a value obtained by adding 0.75 mm of the sparse portion to the pitch of 7.6 mm of the fiber fabric, i.e., 8.35 mm, is more preferable in consideration of the expansion of the fiber pitch during shaping. In this manner, the area where the fiber fabric and the fixing resin match with each other in arrangement pitch can be minimized, and the pitch spacing is also minimized in that area. Therefore, the maximum tackiness is obtained.

Figure 6:
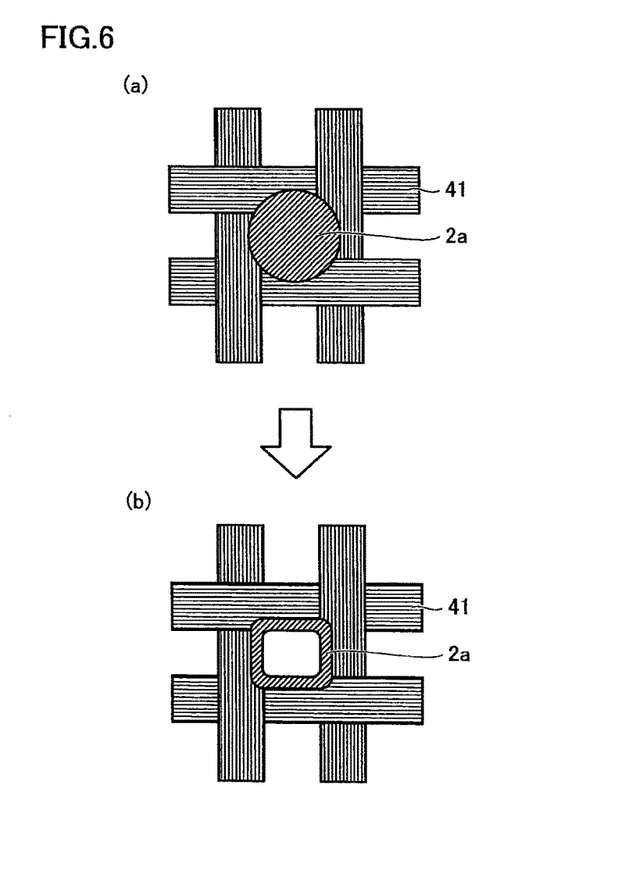
FIG. 6 shows top views each showing the relation between a dry fiber fabric and a dot-like fixing resin in an example of a preform of the present invention.

It should be noted that, as shown in FIG. 6 at (a), when the area of dot-like fixing resin 2a is larger than portion 41a where fibers 41 of dry fiber fabric 4 are sparse, the viscosity of fixing resin 2a can be reduced by conducting a heated air treatment to produce a gap in fixing resin 2a for resin impregnation, as shown in FIG. 6 at (b). The heated air treatment at this time is preferably conducted after the shaping into a molding die is completed and the fiber is fixed by vacuum holding.

Since the dot-like fixing resin is in an uncured or partially-cured state, its viscosity is reduced by a heat treatment. Therefore, the film-like fixing resin present in the sparse portion penetrates into the fiber by capillarity. In this manner, the flow path of a liquid thermosetting resin can be secured.

Figure 7:
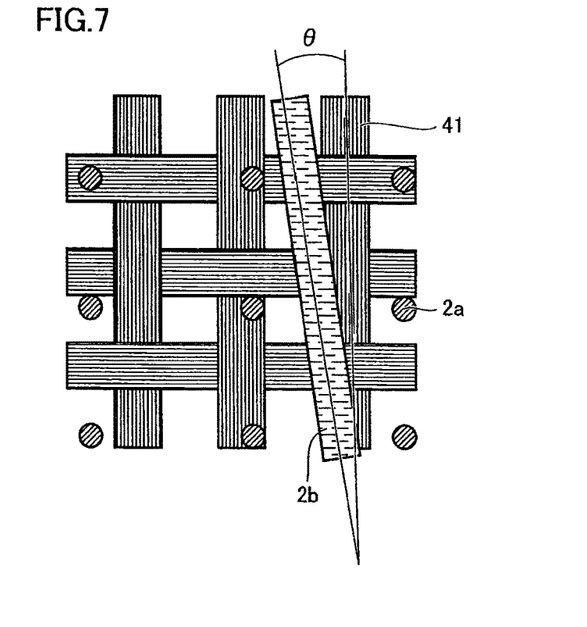
FIG. 7 is a top view showing the relation between a dry fiber fabric and a linear fixing resin in an example of a preform of the present invention.

FIG. 7 shows the relation between dry fiber fabric 4 and linear fixing resin 2b. The width of linear fixing resin 2b is preferably smaller than the pitch of fibers 41, and more preferably smaller than the width of fiber 41, so as not to block the gap between fibers 41. When the fiber width is 6.85 mm, the line width in the state of a resin-equipped film is preferably ¼ to ⅓ of the fiber width of 6.85 mm in consideration of the state attached by pressure similarly to the case of dot.

Moreover, the arrangement direction of linear fixing resin 2b preferably differs from the direction of fibers. When the dry fiber fabric is a plain weave cloth, for example, an angle θ formed by the direction of fibers and the arrangement direction of the linear fixing resin is preferably an inclination other than 0°, 45° and 90°.

Figure 8:
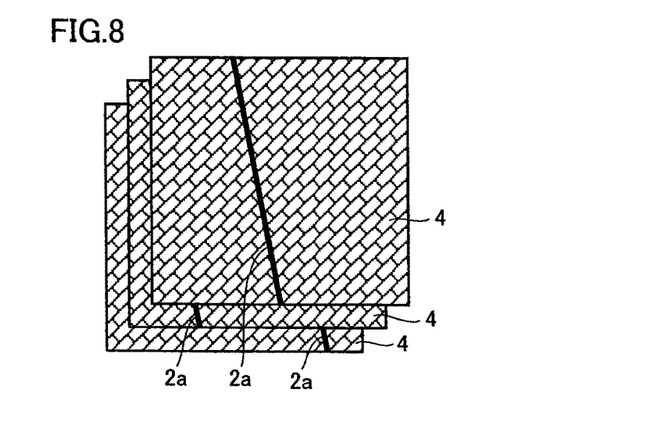
FIG. 8 is a top view showing the relation between a dry fiber fabric and a linear fixing resin in an example of a preform of the present invention.

In a laminate composed of a plurality of dry fiber fabrics 4, as shown in FIG. 8, the position of linear fixing resins 2b preferably differs among respective dry fiber fabrics 4.

In this manner, the above-described fixing resin does not interfere with the dry fiber fabric from being impregnated with a liquid thermosetting resin which will be described later. Moreover, fabricating a preform laminate in advance eliminates the necessity to shape all of dry fiber fabrics equipped with the fixing resin one by one on a molding die. It is noted that the fixing resin could be used appropriately by a required amount at a required portion.

<Method for Producing Fiber-Reinforced Plastic>

A method for producing a fiber-reinforced plastic molding of the present invention includes, in the following order, the steps of shaping by fixing the above-described preform to a molding die with a fixing resin interposed therebetween while detaching the release film of the above-described preform, impregnating the dry fiber fabric in the preform fixed to the molding die, with a liquid thermosetting resin, curing the liquid thermosetting resin and the fixing resin to form a fiber-reinforced plastic molding, and demolding the fiber-reinforced plastic molding from the molding die.

Figure 9:
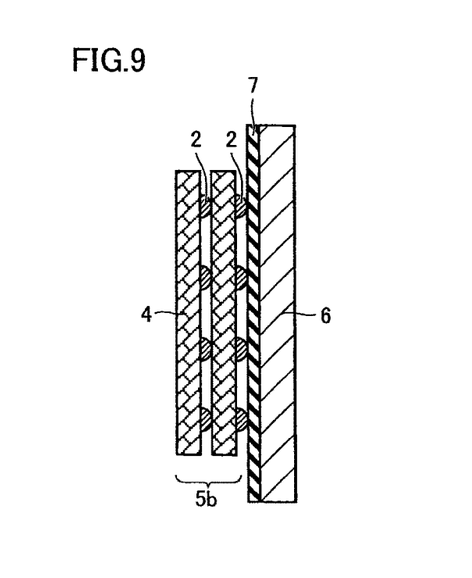
FIG. 9 is a schematic cross-sectional view showing an example of a method for shaping a preform of the present invention into a molding die.
Figure 10:
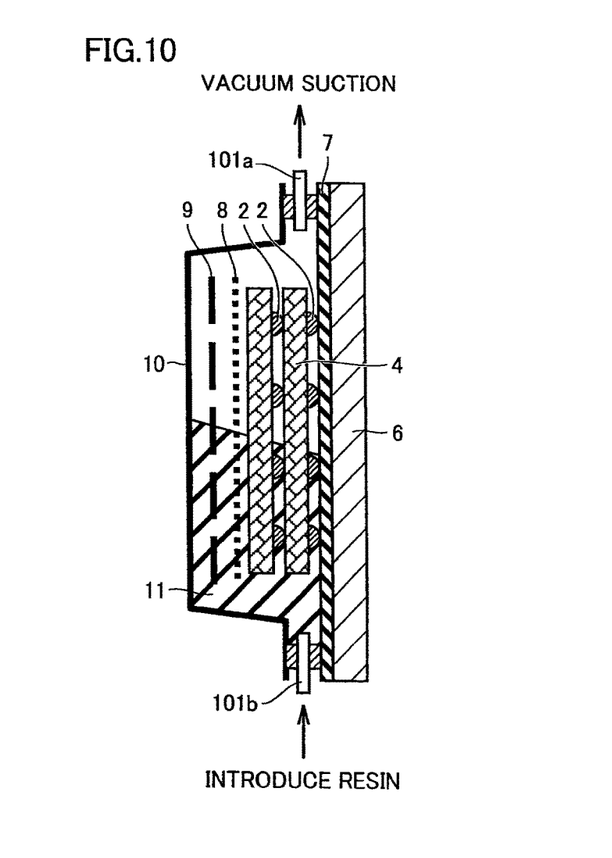
FIG. 10 is a schematic cross-sectional view showing a condition of a step of impregnating in an example of a method for producing a fiber-reinforced plastic molding of the present invention.

With reference to FIGS. 9 and 10, an example of a method for producing a fiber-reinforced plastic molding will be described. Firstly, as shown in FIG. 9, a molding die 6 is prepared having a surface processed with a Teflon (registered trademark) coating 7, and preform laminate 5b is brought into contact with molding die 6 with fixing resin 2 interposed therebetween and fixed thereto. Accordingly, fixing resin 2 fixes dry fiber fabric 4 also to Teflon (registered trademark) coating 7 on the surface of molding die 6. Therefore, no positional displacement due to gravity occurs.

Next, as shown in FIG. 10, a peel ply 8 and a flow media 9 are arranged on preform laminate 5b, and the entirety is covered with a bagging film 10 and sealed. At this stage, Teflon (registered trademark) tubes 101a, 101b are provided at two locations on the edges of the sealed space and stopped with valves. Further, Teflon (registered trademark) tube 101a is connected to a vacuum pump, and Teflon (registered trademark) tube 101b is connected to a resin tank.

Next, the vacuum pump is actuated to reduce pressure in the space sealed by bagging film 10. After the pressure is reduced in the sealed space, a valve of Teflon (registered trademark) tube 101b on the side of the resin tank is opened, so that a liquid thermosetting resin 11 is absorbed into the sealed space of a reduced pressure. Liquid thermosetting resin 11 impregnates into dry fiber fabric 4 while expanding though a large-mesh flow media 9. When liquid thermosetting resin 11 reaches Teflon (registered trademark) tube 101a on the side of the vacuum pump, the valve of the Teflon (registered trademark) tube 101b on the resin supplying side is closed.

Then, liquid thermosetting resin 11 is left until gelated. Thereafter, the vacuum pump is disconnected, and annealing is performed using an oven or the like, so that liquid thermosetting resin 11 and fixing resin 2 are completely cured together. Finally, separation at the interface between peel ply 8 and the fiber-reinforced plastic and at the interface between molding die 6 and the fiber-reinforced plastic is performed, so that the fiber-reinforced plastic can be obtained.

Liquid thermosetting resin 11 is not particularly limited as long as it is a low-viscosity thermosetting resin such as an epoxy resin, a polyester resin and a vinyl ester resin. However, a vinyl ester resin is preferable.

Preferably, the condition for curing the above-described fixing resin is not different from the condition for curing the liquid thermosetting resin. In the case where the fixing resin is a vinyl ester resin having both of a (meta-)acryloyl group and an epoxy group in an identical resin skeleton and is a partially-cured resin in which only the epoxy group has reacted, and the above-described liquid thermosetting resin is a vinyl ester resin, the fixing resin and the liquid thermosetting resin can be cured at the same time in the above-described step of curing. Therefore, the steps for production can be shortened, resulting in advantageous improvement of the production efficiency.

The above-described step of curing is preferably performed by the stepcure of conducting the steps of curing in a stepwise manner. The stepcure includes a pre-step process (precure) and a post-step process (aftercure, postcure). The precure is a pre-process step in curing a thermosetting resin, and curing is performed to an extent that a final strength is not obtained, and a main object is to form a stable shape. Generally, preliminary curing is performed at a temperature slightly below the glass-transition point. The aftercure is a curing step for obtaining the final strength and is generally performed in an environment at a higher temperature for a longer time than the precure. Performing the step of curing by such stepcure can minimize an influence exerted on the adhesive interfaces different in expansion coefficient due to thermal expansion and contraction.

During the aftercure for the above-described liquid thermosetting resin, the above-described fixing resin is preferably cured completely. This is for preventing decrease in strength due to uncured resin.

Figure 11:
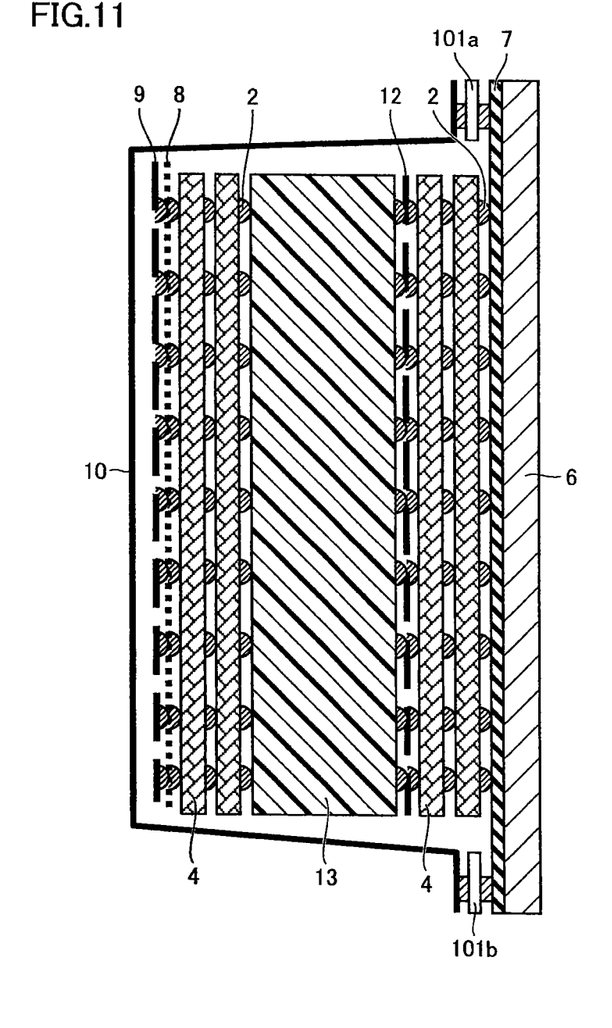
FIG. 11 is a schematic cross-sectional view showing a condition of a step of impregnating in another example of a method for producing a fiber-reinforced plastic molding of the present invention.

It is noted that resin-equipped film 3 can also be used in the step of fixing sub-materials, such as peel ply 8 and flow media 9, as shown in FIG. 11. Furthermore, it can also be used in the step of fixing a foam core material 13 required when forming a sandwich structure of light weight and high rigidity onto dry fiber fabric 4 and the step of fixing dry fiber fabric 4 to foam core material 13. It is noted that an inner media 12 is a flow media for integrally molding a sandwich structure, which remains in a molding.

It should be understood that the embodiment disclosed herein is illustrative and non-restrictive in every respect. The scope of the present invention is defined by the terms of claims, rather than the description set forth above, and is intended to include any modifications within the scope and meaning equivalent to the terms of claims.

REFERENCE SIGNS LIST 1 release film; 2, 2a, 2b fixing resin; 3 resin-equipped film; 4 dry fiber fabric; 41 fiber flux; 5, 5a preform; 5b preform laminate; 6 molding die; 7 Teflon (registered trademark) coating; 8 peel ply; 9 flow media; 10 bagging film; 11 liquid thermosetting resin; 12 inner media; 13 foam core material; 101a, 101b Teflon (registered trademark) tube.

The invention claimed is:

1. A method for producing a preform and a fiber-reinforced plastic molding including a dry fiber fabric and a resin-equipped film, said resin-equipped film including a release film and a fixing resin fixed to one side of the release film and containing a partially-cured thermosetting resin having tackiness at a room temperature, the method comprising in the following order:

fixing said resin-equipped film rolled out from a roll state to a surface of said dry fiber fabric rolled out from a roll state with said fixing resin interposed therebetween, thereby obtaining a first dry fiber fabric having the release film and the fixing resin;

separately fixing a second resin-equipped film rolled out from a roll state to a surface of a second dry fiber fabric rolled out from a roll state with said fixing resin interposed therebetween, and detaching said release film from the second resin-equipped film attached by pressure to said second dry fiber fabric, thereby obtaining said second dry fiber fabric having the fixing resin;

laminating said second dry fiber fabric on a surface of said first dry fiber fabric, said first dry fiber fabric and said second dry fiber fabric being laminated by the fixing resin of said second dry fiber fabric;

shaping by fixing said preform to a molding die with the fixing resin interposed therebetween while detaching said release film of the preform;

impregnating said first dry fiber fabric and said second dry fiber fabric in said preform fixed to said molding die, with a liquid thermosetting resin;

curing said liquid thermosetting resin and said fixing resin to form the fiber-reinforced plastic molding; and demolding the fiber-reinforced plastic molding from said molding die.

2. The method for producing a fiber-reinforced plastic molding according to claim 1, wherein said shaping further includes fixing a peel ply and/or a flow media onto the second dry fiber fabric with the fixing resin adhering thereto.

3. The method for producing a fiber-reinforced plastic molding according to claim 1, wherein said fiber-reinforced plastic molding has a foam core material between the first and second dry fiber fabrics, the method comprising attaching said dry fiber fabrics and said foam core material by pressure.

* * * * *